United States Patent Office 3,265,515
Patented August 9, 1966

3,265,515

METHOD FOR RESTORING PUNCHED CARDS

Paul C. Wilhelmsen, 1938 Westover Drive, Pleasant Hill, Calif.

No Drawing. Filed June 1, 1964, Ser. No. 371,738
2 Claims. (Cl. 106—193)

This application is a continuation-in-part application of copending application of the same inventor, Serial No. 180,811, filed March 19, 1962 (now abandoned).

Modern punched card data processing systems have found their way into most industries of the world. An ever increasing amount of technology is developing in this field. In these systems, two means of scanning the punched cards are available. One uses pairs of contact brushes which contact when a hole in the card is sensed. The other uses a beam of light passing through the card and a photoelectric sensing device which detects when the beam passes through a hole.

These punched cards are generally divided into fields, each representing different data. Frequently, due to an error or a desired modification, a change must be made in one field but not in the rest of the card. Unless a method were available to restore the pre-existing holes only in the field to be changed and not in the rest of the card, an entirely new card would have to be prepared. The restored holes must withstand wear and bending, and must be capable of being repunched without clogging or plugging the punching apparatus. Further, where a light sensing system is used, these restored holes must be opaque to light.

In the past, various methods have been used to restore an entire punched card to its original unpunched condition. These methods generally involve dipping the card in some form of wax or paste and then colandering the card to apply the wax or paste uniformly throughout its surface. However, these methods are not useful where only a portion of the holes in the card need restoration. Furthermore, various features make these methods unsatisfactory for today's rapid data processing. Paste causes the card to shrink or bend during drying which often ruins it. Wax must be heated before application and also lacks the mechanical strength to remain firm in the opening throughout subsequent use. Additionally, where a wax-filled hole is repunched, the wax tends to deposit on the punch and hinder its operation.

Furthermore, the above methods are not applicable where only a portion of the holes in a card are to be restored. Immersion of the entire card in the paste or wax is required. Where restoration of only a portion of the holes is desired, adhesive patches have often been used. Some of these require moistening and hence are very difficult to apply. Those using pressure-sensitive adhesive are easier to apply but create problems in later use of the cards. They tend to peel from the card during card handling, causing errors in the cards and clogging the processing equipment. Further, these patches cannot be repunched. One side is permanently adhesive and sticks to the punch when repunching is attempted. This permanent adhesive also causes cards to stick together.

Other than adhesive patches, one prior art method for restoring only a portion of the holes in a card (U.S. Patent No. 2,285,362) uses an automated card reconditioning system with a fluid-carrying wick to brush across the field to be restored. The restoration fluid flows down the wick and into the hole to be filled. In order to obtain such flow, the fluid, prepared by dissolving a plastic in a solvent, must be sufficiently nonviscous to permit ease of flow. Low viscosity is achieved by using a high ratio of the highly volatile solvent (methyl chloride and acetone) to plastic (acetyl cellulose). This high ratio results in high volatility and rapid evaporation of the fluid during application, necessitating the use of elaborate apparatus to reduce pressure and avoid premature clotting. Because of the availability of these wick application systems, however, it was generally believed in the prior art that a low viscosity, highly volatile restoration fluid was required.

Completely unexpected from the teachings of the prior art, the present invention provides a unique card-restoring composition of relatively high viscosity and reduced volatility. It has been found that this high viscosity composition can be simply applied to cards without the need of the elaborate equipment shown in the prior art. Since rapid drying of the restored cards is essential, it would be expected from the prior art teachings that the less volatile invention composition would be too slow drying to be useful. But it has been surprisingly discovered that the composition of the invention dries very rapidly in spite of its reduced volatility and additionally leaves a thicker film after drying. This thicker film stands up under the stresses and strains of card handling much better than the wick-applied thin films of the prior art.

The card-restoring composition of this invention comprises a film-forming plastic material which is solid and flexible at room temperature and a solvent for said plastic material. It is essential that the composition of this invention have a viscosity from about 150 to 15,000, preferably 250 to 10,000 centistokes at 25° C. and a surface tension less than about 40 dynes per square centimeter, preferably between 10 and 30 dynes per square centimeter at 25° C.

Suitable plastic materials for the invention include cellulose acetate, cellulose nitrate, cellulose acetate butyrate, ethyl cellulose, polyvinyl chloride, polystyrene, nylon, polymethylmethacrylate, and many other film-forming plastic materials well known in the art which are solid and flexible at room temperature. Typical common cellulose acetates useful for this invention are fully described in U.S. Patent 2,363,182.

A solvent should be chosen which will dissolve the plastic material used. For cellulose acetate, ethyl acetate, acetone, or their mixtures are known to be suitable. For polyvinylchloride, tetrahydrofuran is commonly employed. Acetone is used for polystyrene, water-alcohol mixtures are used for nylon, methylene dichloride for polymethylmethacrylate, and so on. The actual plastic-solvent pair chosen for the invention is not critical so long as their mixture will result in a composition having the required viscosity and surface tension. A viscosity which is too low results in difficulty in application by the method of the invention and in failure to completely fill the hole. Too high a viscosity results in a mixture which is stringy and very hard to use and apply.

Proper viscosity is achieved by using a lower solvent/plastic weight ratio than used in the wick-applied system of the prior art. In general, a solvent/plastic weight ratio from about 12/1 to 4/1 will yield the desired viscosity, preferably 8/1 to 5/1. This of course can change with the particular plastic and solvent selected.

It is critical to the invention that the final composition be of proper surface tension. When applied to the card, the composition must flow into and completely fill the holes. If the surface tension is too high, the composition will form a ball and not readily fill the hole. If it is too low, the film will break before hardening, resulting in an unsatisfactory restoration. It has been found that the surface tension of the invention composition must be less than about 40 dynes per square centimeter, and preferably between about 10 and 30 dynes per square centimeter at 25° C. The plastic-solvent pairs named above when mixed in the above-described weight ratios of solvent to plastic, as well as numerous other pairs known in the art will have the required surface tension.

In a preferred embodiment of the invention, a known anti-foaming agent is used in the composition to eliminate bubbles. These bubbles tend to break the film and destroy the utility of the restored card. There are many suitable anti-foaming agents, such as various silicones, e.g., poly(diphenylsiloxane). Generally about 0.01 to 2.0 percent of these anti-foaming agents is used, preferably 0.05 to 0.5 percent.

Where light sensitized systems are used, it is necessary that the restored hole be opaque to light transmission. The compositions of the present invention may be made opaque by adding an opaque pigment or filler. Anywhere from about 1 percent to 20 percent of the pigment is used depending on the color density required. Generally about 2 to 10 percent is satisfactory. The amount and nature of the pigment or filler is selected to achieve a sufficient degree of opaqueness of the filled hole to register as unpunched in a light sensitized punched hole sensing device.

In still another embodiment of the invention, a plasticizer is added to lessen the brittleness and increase the strength of the restored hole. Any plasticizers generally known in the art for the particular plastic used, e.g., dimethyl phthalate are suitable.

One of the most important advantages of the invention is the ease of application of the restoring composition. The simplest and most practical way of applying the fluid is by means of a squeeze bottle, similar to those used for ketchup and other viscous materials. These bottles have a small opening and are generally made of polyethylene or similar plastic. The user may merely squeeze a small amount of the fluid from the bottle into the desired hole in the card. The hole is thereby filled without substantially altering the dimensions of the card. The card is then allowed to dry briefly, generally less than about one minute and is thereafter ready for immediate use. Of course other methods of application obvious to one skilled in the art, such as a brush or automated applicator, can easily be used.

To more clearly illustrate the present invention, the following examples are included. The examples merely show specific compositions of preferred embodiments of the invention and are not to be construed as placing further limitations on the scope of the invention as claimed.

EXAMPLE 1

The following composition was prepared.

| Compound: | Approximate percent (by weight) |
|---|---|
| Plastic cellulose acetate | 12½ |
| Solvent: | |
| Acetone | 64 |
| Ethyl acetate | 19 |
| Pigment, toluidine red | 4 |
| Anti-foaming agent | ½ |
| | 100 |

The viscosity of the above composition was measured and found to be about 10,000 centistokes at 25° C. The surface tension was within the preferred range of the invention.

The above composition was spread from a squeeze bottle into a portion of the holes in a punched card. The card was allowed to dry one minute and a few of the filled holes were repunched. The card was then used in an automated light-sensing data processing system and the filled holes registered therein are unpunched. Bending of the card failed to destroy the restorations.

Other compositions were also prepared and tested as above with satisfactory results. These used the following plastic-solvent pairs:

Polymethylmethacrylate-methylene dichloride
Polyvinylchloride-tetrahydrofuran
Zytel 61-ethyl alcohol and water (80 percent by weight alcohol)

To illustrate the criticality of the viscosity limitations of the composition of the invention, the following examples are presented:

EXAMPLE 2

The following composition was prepared.

| Compound: | Approximate percent (by weight) |
|---|---|
| Plastic, cellulose acetate | 8 |
| Solvent: | |
| Acetone | 76½ |
| Ethyl acetate | 12½ |
| Pigment, toluidine red | 2½ |
| Anti-foaming agent | ½ |
| | 100 |

The viscosity of the above composition was measured and found to be about 150 centistokes at 25° C. This was about the lower limit of viscosity which could be tolerated for this invention.

When the above composition was applied by means of a wick applicator of the prior art, it was found to be too viscous to flow readily down the wick. Therefore, it is apparent that the compositions of the prior art were substantially less viscous than those of this invention.

To approximate prior art compositions, additional solvent was added to the above mixture, reducing the viscosity below the limits required by this invention. When this mixture was applied to a card in the manner described in Example 1, it did not flow into the holes and the result was highly unsatisfactory. However, the resulting reduced viscosity composition was satisfactory for a prior art wick applicator.

EXAMPLE 3

The following composition was prepared.

| Compound | Weight (grams) |
|---|---|
| Cellulose acetate having an acetyl content between 37–38% and a viscosity of 60–80 sec. as measured by the ASTM method of D-301-50 | 500 |
| Acetyl triethyl citrate | 100 |
| Toluidine red | 80 |
| Silicone | 4 |
| Acetone | 3,000 |

The cellulose acetate material employed in the above mixture may be substituted with a cellulose acetate having a viscosity of 40–60 sec., or one with a viscosity of 20–40 sec. Moreover, for the acetyl triethyl citrate plasticizer, dioctyl phthalate, camphor, dimethyl phthalate, and diamyl tartrate could be used. The solvent, instead of acetone can be methyl acetate, methyl chloride-ethanol mixtures, or ethylene dichloride-ethanol mixtures.

EXAMPLE 4

The following composition was prepared.

| Compound: | Weight (grams) |
|---|---|
| Cellulose nitrate, 11.8–12.2% nitrogen, Regular Soluble (R.S.) 60–80 sec. for a 12–12.2% solution measured by the ASTM method D-301-50, with a polymerization number of about 375 | 500 |
| Camphor | 100 |
| Toluidine red | 80 |
| Silicone | 4 |
| Acetone | 3,000 |

The cellulose nitrate employed may, in the alternative, have an R.S. value of ½ sec., 5–6 sec., 15–20 sec., or 30–40 sec. Moreover, the plasticizer, instead of camphor, may be a phthalate, such as dimethyl phthalate, diethyl phthalate, dibutyl phthalate, or other dialkyl phthalate, or a tartrate, a citrate, a phosphate (e.g., tributyl phosphate or tricresyl phosphate), adipate, or castor oil may be employed as the plasticizer. For the solvent, instead of acetone, a mixture of acetone with another chemical may be used. This additional chemical may be hexane, ethyl alcohol, n-butyl alcohol, n-butyl acetate, ethyl acetate, and others. A mixture of ethyl alcohol and ethyl acetate may also be employed as the solvent.

EXAMPLE 5

The following mixture was prepared.

| Compound: | Weight (grams) |
|---|---|
| Cellulose acetate butyrate (½ sec. measured by ASTM method D–1343–54%, having an acetyl content of 13% and a butyryl content of 37%) | 1,200 |
| Camphor | 100 |
| Toluidine red (pigment) | 80 |
| Acetone | 3,000 |

Instead of camphor as the plasticizer, castor oil, dibutyl sebecete, a phthalate, such as dioctyl phthalate, or a phosphate such as tri-isobutyl phosphate may be substituted. For the acetone solvent, a toluene-ethyl alcohol mixture or methyl acetate can be used.

EXAMPLE 6

The following mixture was prepared.

| Compound: | Weight (grams) |
|---|---|
| Ethyl cellulose (having a viscosity of a 5% by weight solution in 80–20 toluene-ethyl alcohol at 25° C. or 35 centipoise-seconds); (ethoxy content 46.8–48.5%) | 830 |
| Castor oil | 280 |
| Carbon black | 40 |
| A mixture of hexane (25%), toluene (15%), ethyl alcohol (10%), n-butyl alcohol (15%), and naptha solvent (35%). | |

In the above mixture a "type 150" ethyl cellulose may be used having a viscosity of 135–165 cps. Additionally, for the raw castor oil plasticizer, a blown castor oil may be substituted, or a phthalate, such as dibutyl phthalate, or a phosphate, such as tricresyl phosphate, or a stearate, such as butyl stearate. An alternative solvent mixture is toluene (40%), xylene (30%), ethyl alcohol (15%), and n-butyl alcohol (15%).

EXAMPLE 7

The following mixture was prepared.

| Compound: | Weight (grams) |
|---|---|
| Polystyrene having a molecular weight of about 80,000 as determined by light scattering | 800 |
| Toluidine red | 80 |
| 1,1,1-trichloroethylene | 3,000 |

In the alternative, a polystyrene having a molecular weight of 100,000 or 120,000 can be substituted for the 80,000 molecular weight polystyrene used above. For a solvent, instead of trichloroethylene, methylene chloride, or methyl-ethyl ketone may be used.

As will be obvious to one skilled in the art, many modifications or improvements could be made by one skilled in the art in the composition and method described above which are within the scope of the invention. Therefore, the only limitations to be placed on the invention are those included in the following claims:

I claim:

1. A method of restoring holes in a punched card which comprises filling said holes individually, without substantially altering the dimensions of said card, with a substantially opaque composition consisting essentially of a film-forming plastic material which is solid and flexible at room temperature, a substantially opaque pigment, and a solvent for said plastic material, said composition having a viscosity from about 150 to 15,000 centistokes at 25° C., and a surface tension less than about 40 dynes per square centimeter at 25° C.

2. A method of restoring holes in a punched card which comprises filling said holes individually, without substantially altering the dimensions of said card, with a substantially opaque composition consisting essentially of a film-forming plastic material which is solid and flexible at room temperature, a substantially opaque pigment, and a solvent for said plastic material, said composition having a viscosity from about 250 to 10,000 centistokes at 25° C. and a surface tension between about 10 and 30 dynes per square centimeter at 25° C.

References Cited by the Examiner

UNITED STATES PATENTS

| | | | |
|---|---|---|---|
| 1,950,662 | 3/1934 | Dreyfus | 106—196 |
| 2,285,362 | 6/1942 | Rottke | 117—2 |
| 2,296,337 | 9/1942 | Cummings | 106—196 |

ALEXANDER H. BRODMERKEL, *Primary Examiner.*

L. B. HAYES, *Assistant Examiner.*